United States Patent
Yukimasa et al.

(10) Patent No.: US 8,906,564 B2
(45) Date of Patent: *Dec. 9, 2014

(54) HYDROGEN GENERATOR, FUEL CELL SYSTEM, AND METHOD FOR OPERATING HYDROGEN GENERATOR

(75) Inventors: Akinori Yukimasa, Osaka (JP); Junji Morita, Kyoto (JP); Akinari Nakamura, Shiga (JP)

(73) Assignee: Panasonic Corporation, Osaka (JP)

( * ) Notice: Subject to any disclaimer, the term of this patent is extended or adjusted under 35 U.S.C. 154(b) by 495 days.
This patent is subject to a terminal disclaimer.

(21) Appl. No.: 13/142,525

(22) PCT Filed: Mar. 30, 2010

(86) PCT No.: PCT/JP2010/002324
§ 371 (c)(1),
(2), (4) Date: Jun. 28, 2011

(87) PCT Pub. No.: WO2010/116685
PCT Pub. Date: Oct. 14, 2010

(65) Prior Publication Data
US 2011/0269038 A1 Nov. 3, 2011

(30) Foreign Application Priority Data

Mar. 30, 2009 (JP) ................... 2009-082943
Mar. 30, 2009 (JP) ................... 2009-082944

(51) Int. Cl.
*H01M 8/06* (2006.01)
*C01B 3/38* (2006.01)

(52) U.S. Cl.
CPC ............ *H01M 8/0618* (2013.01); *C01B 3/384* (2013.01);
(Continued)

(58) Field of Classification Search
None
See application file for complete search history.

(56) References Cited

U.S. PATENT DOCUMENTS 7,419,518 B2 9/2008 Ukai et al.
2003/0104711 A1 6/2003 Nakamura et al.
(Continued)

FOREIGN PATENT DOCUMENTS

EP 1557395 A2 7/2005
JP 2000-095504 A 4/2000
(Continued)

OTHER PUBLICATIONS

Machine translation of JP 2007-290942, Nov. 2007.*

(Continued)

*Primary Examiner* — Jonathan Crepeau
(74) *Attorney, Agent, or Firm* — McDermott Will & Emery LLP

(57) ABSTRACT

The possibility of carbon deposition from a raw material gas is made lower than before in a pressure compensating operation carried out after stopping the stop process of a hydrogen generator and a fuel cell system including the hydrogen generator.

The hydrogen generator includes: a raw material supply unit (102, 103) configured to function to block supply of a raw material; a steam supply unit (104, 105) configured to function to block supply of steam; a reformer 108 including a reforming catalyst 109 and configured to generate a hydrogen-containing gas by using the raw material supplied from the raw material supply unit and the steam supplied from the steam supply unit; a closing unit 116 configured to block at least a gas passage provided downstream of the reformer; and a controller 140 configured to execute a pressure compensating operation in which: during stop of the hydrogen generator, with hydrogen contained in the reformer, the supply of the raw material from the raw material supply unit and the supply of the steam from the steam supply unit are blocked, and the closing unit is closed; and to compensate a pressure decrease in the reformer due to a temperature decrease in the reformer after the closing of the closing unit, with the hydrogen contained in the reformer, the steam is supplied from the steam supply unit to the reformer.

14 Claims, 8 Drawing Sheets

(52) U.S. Cl.
CPC ... *C01B 2203/066* (2013.01); *C01B 2203/0811* (2013.01); *C01B 2203/1058* (2013.01); *C01B 2203/1064* (2013.01); *C01B 2203/12* (2013.01); *C01B 2203/1609* (2013.01); *C01B 2203/1619* (2013.01); *C01B 2203/1685* (2013.01); *C01B 2203/169* (2013.01); *Y02E 60/50* (2013.01); *C01B 2203/0233* (2013.01); *C01B 2203/0822* (2013.01); *C01B 2203/1288* (2013.01)
USPC .......................... 429/423; 429/429; 423/652

(56) References Cited

U.S. PATENT DOCUMENTS

| | | |
|---|---|---|
| 2004/0037761 A1 | 2/2004 | Maenishi et al. |
| 2005/0153179 A1 | 7/2005 | Ukai et al. |
| 2005/0164046 A1* | 7/2005 | Fujihara et al. ............... 429/12 |
| 2007/0178337 A1 | 8/2007 | Nakamura et al. |
| 2009/0087701 A1 | 4/2009 | Kuwaba |
| 2010/0047636 A1 | 2/2010 | Tamura et al. |
| 2010/0062294 A1 | 3/2010 | Tamura |

FOREIGN PATENT DOCUMENTS

| | | | |
|---|---|---|---|
| JP | 2002-151124 | | 5/2002 |
| JP | 2002-356307 | A | 12/2002 |
| JP | 2003-306309 | A | 10/2003 |
| JP | 2004-182497 | | 7/2004 |
| JP | 2004-307236 | | 11/2004 |
| JP | 2005-206414 | A | 8/2005 |
| JP | 2005-243330 | * | 9/2005 |
| JP | 2005-340075 | A | 12/2005 |
| JP | 2006-008418 | | 1/2006 |
| JP | 2006-008458 | | 1/2006 |
| JP | 2007-254251 | A | 10/2007 |
| JP | 2007-273171 | | 10/2007 |
| JP | 2007-284265 | | 11/2007 |
| JP | 2007-290942 | | 11/2007 |
| JP | 2008-074654 | A | 4/2008 |
| JP | 2008-303134 | A | 12/2008 |
| JP | 2009-004346 | | 1/2009 |
| WO | 2007/145321 | A1 | 12/2007 |
| WO | 2008/035776 | A1 | 3/2008 |

OTHER PUBLICATIONS

Extended European Search Report issued in Application No. 10735639.6 mailed Dec. 2, 2013.
Extended European Search Report issued in Application No. 10761391.1 mailed Dec. 5, 2013.
United States Office Action issued in U.S. Appl. No. 12/919,174 mailed Dec. 7, 2012.
United States Office Action issued in U.S. Appl. No. 12/919,174 mailed Jul. 18, 2013.
United States Office Action issued in U.S. Appl. No. 12/919,174 mailed Dec. 5, 2013.

* cited by examiner

HYDROGEN GENERATOR, FUEL CELL SYSTEM, AND METHOD FOR OPERATING HYDROGEN GENERATOR

RELATED APPLICATIONS

This application is the U.S. National Phase under 35 U.S.C. §371 of International Application No. PCT/JP2010/002324, filed on Mar. 30, 2010, which in turn claims the benefit of Japanese Application Nos. 2009-082943, filed on Mar. 30, 2009, and 2009-082944, filed on Mar. 30, 2009, the disclosures of which Applications are incorporated by reference herein.

TECHNICAL FIELD

The present invention relates to a hydrogen generator configured to generate a hydrogen-containing gas by using a raw material and steam and a fuel cell system including the hydrogen generator. More specifically, the present invention relates to a pressure compensating operation in a stop process of each of the hydrogen generator and the fuel cell system including the hydrogen generator.

BACKGROUND ART

In domestic fuel cell systems, a start-up/stop operation in which a fuel cell repeatedly generates power and stops depending on electric power consumption of daily life is excellent in light of energy effective utilization, such as a reduction in charges for heat and electricity.

For the purpose of flexibly dealing with the start-up/stop operation, technical problems and their countermeasures regarding the repeated operation of the power generation and stop of the fuel cell are reported. Among these, one example of the techniques regarding the hydrogen generator is that in a fuel cell system, a hydrogen generator including a reformer generates and supplies a fuel gas, and supply of a material gas and steam stops during the operation stop. At this time, remaining steam condenses inside the reformer, and the reformer becomes a negative pressure state. This negative pressure state may cause problems, such as damages on the reformer and leakage of a combustible gas. Reported as means for resolving the negative pressure state is a technique of injecting a raw material gas to carry out pressure compensation (see PTL 1, for example).

Also reported as the means for resolving the negative pressure state is a technique of injecting steam to carry out the pressure compensation (see PTL 2, for example).

CITATION LIST

Patent Literature

PTL 1: Japanese Laid-Open Patent Application Publication No. 2007-254251
PTL 2: Japanese Laid-Open Patent Application Publication No. 2007-284265

SUMMARY OF INVENTION

Technical Problem

When the conventional hydrogen generator executes the pressure compensation using the raw material gas as above, carbon deposition may occur. Specifically, after the operation of the hydrogen generator stops, the hydrogen generator is high in temperature for a while. Therefore, if the pressure compensation using the raw material gas is carried out to compensate a reduction in internal pressure of the reformer, which is caused due to a reduction in temperature of the hydrogen generator, in a temperature range in which the carbon deposition from the raw material gas occurs, the carbon deposition may occur.

However, the above problem is not considered in the above conventional fuel cell system.

The present invention was made to solve the above conventional problem, and an object of the present invention is to provide a hydrogen generator and a fuel cell system, each of which is configured such that the possibility of the carbon deposition from the raw material gas is made lower than before in the pressure compensating operation carried out after a fuel gas generating operation stops.

Solution to Problem

The present inventors have found that the pressure compensating operation using steam is effective to prevent the carbon deposition from the raw material gas. However, the problem is that if a reforming catalyst is exposed to high-temperature steam, the catalyst deteriorates by, for example, steam oxidation. To solve this problem, the present inventors have found that the steam oxidation can be prevented by hydrogen existing in the reformer sealed.

To solve the above problems, a hydrogen generator of the present invention includes: a raw material supply unit configured to function to block supply of a raw material; a steam supply unit configured to function to block supply of steam; a reformer including a reforming catalyst and configured to generate a hydrogen-containing gas by using the raw material supplied from the raw material supply unit and the steam supplied from the steam supply unit; a closing unit configured to block at least a gas passage provided downstream of the reformer; and a controller configured to execute a pressure compensating operation in which: during stop of the hydrogen generator, with hydrogen contained in the reformer, the supply of the raw material from the raw material supply unit and the supply of the steam from the steam supply unit are blocked, and the closing unit is closed; and to compensate a pressure decrease in the reformer due to a temperature decrease in the reformer after the closing of the closing unit, with the hydrogen contained in the reformer, the steam is supplied from the steam supply unit to the reformer.

In accordance with this configuration, the pressure compensation of the hydrogen generator can be carried out by the supply of the water. The water is supplied from a water supply unit to an evaporator. The evaporator generates the steam, and the steam is supplied to the inside of the reformer in which the pressure is decreased. With this, the pressure compensating operation can be executed while suppressing the deterioration of the catalyst due to the carbon deposition from the raw material.

In addition, the possibility that the reforming catalyst is exposed to only the high-temperature steam is reduced, and the deterioration of the reforming catalyst is suppressed.

The above object, other objects, features and advantages of the present invention will be made clear by the following detailed explanation of preferred embodiments with reference to the attached drawings.

Advantageous Effects of Invention

In the hydrogen generator and fuel cell system of the present invention, the possibility of the carbon deposition from the raw material gas is made lower than before in the pressure compensating operation carried out after the stop of the hydrogen generating operation of the hydrogen generator. In addition, the possibility that the reforming catalyst is exposed to only the high-temperature steam is reduced, and the deterioration of the reforming catalyst due to the steam oxidation is suppressed.

DESCRIPTION OF EMBODIMENTS

Figure 1:
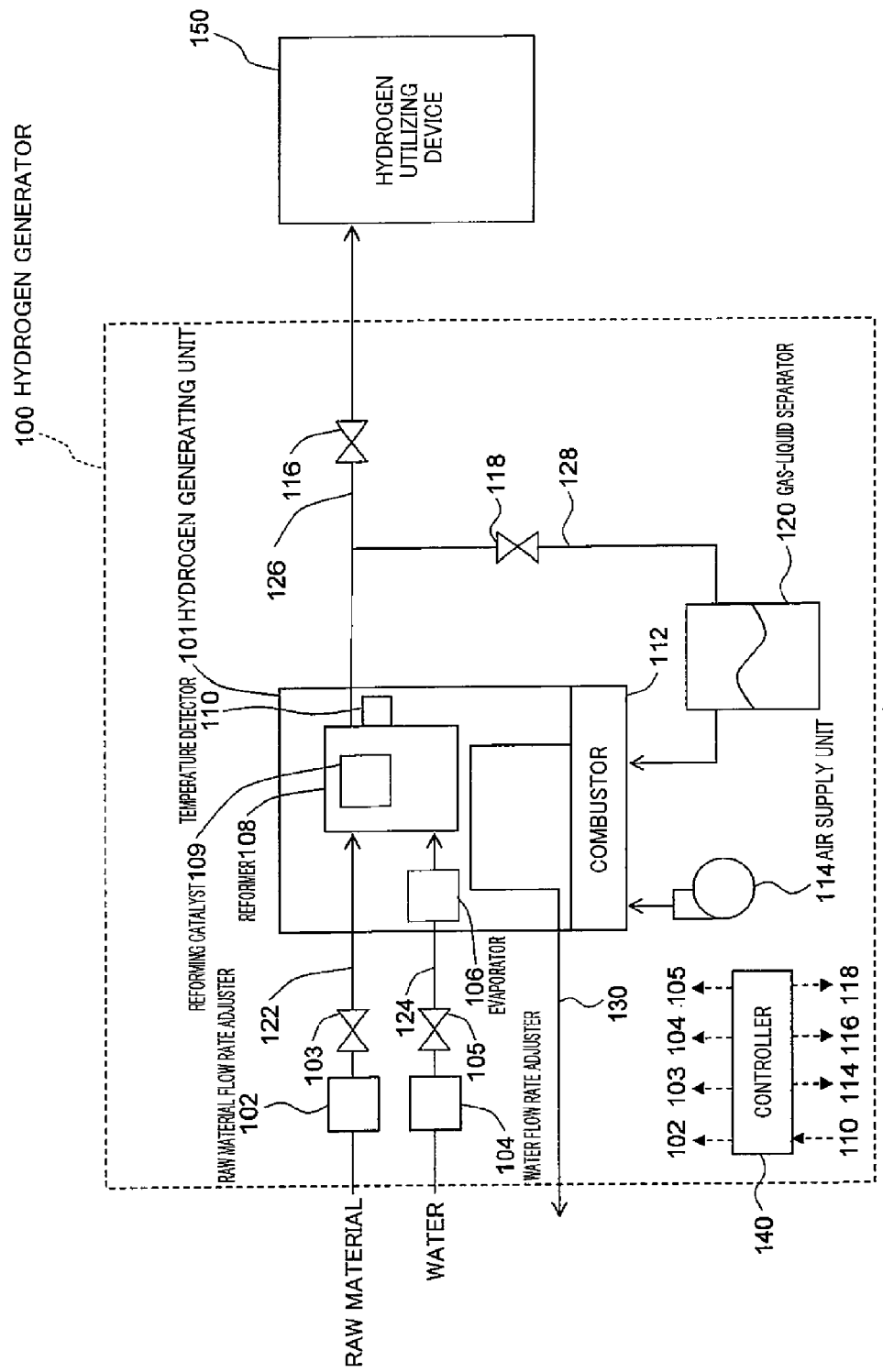
FIG. 1 is a block diagram showing one example of a schematic configuration of a hydrogen generator of Embodiment 1 of the present invention.

Hereinafter, a hydrogen generator of the present invention and a fuel cell system including the hydrogen generator will be explained in reference to the drawings.

A first hydrogen generator includes: a raw material supply unit configured to function to block supply of a raw material; a steam supply unit configured to function to block supply of steam; a reformer including a reforming catalyst and configured to generate a hydrogen-containing gas by using the raw material supplied from the raw material supply unit and the steam supplied from the steam supply unit; a closing unit configured to block at least a gas passage provided downstream of the reformer; and a controller configured to execute a pressure compensating operation in which: during stop of the hydrogen generator, with hydrogen contained in the reformer, the supply of the raw material from the raw material supply unit and the supply of the steam from the steam supply unit are blocked, and the closing unit is closed; and to compensate a pressure decrease in the reformer due to a temperature decrease in the reformer after the closing of the closing unit, with the hydrogen contained in the reformer, the steam is supplied from the steam supply unit to the reformer.

In accordance with this configuration, the pressure compensation of the hydrogen generator can be carried out by the supply of the water. The water is supplied from a water supply unit to an evaporator. The evaporator generates the steam, and the steam is supplied to the inside of the reformer in which the pressure is decreased. With this, the pressure compensating operation can be executed while suppressing the deterioration of the catalyst due to the carbon deposition from the raw material.

In addition, the possibility that the reforming catalyst is exposed to only the high-temperature steam is reduced, and the deterioration of the reforming catalyst due to the steam oxidation is suppressed.

The expression "with the hydrogen contained in the reformer" denotes that the hydrogen, the amount of which is an amount necessary to suppress the steam oxidation of the reforming catalyst, exists in the reformer.

The raw material includes an organic compound containing at least carbon and hydrogen as constituent elements. For example, a hydrocarbon-based gas, such as methane or propane, or an alcohol, such as methanol or ethanol, is used.

Blocking the supply of the raw material denotes that a raw material gas passage connected to the reformer is blocked by a block function of the raw material supply unit. Blocking the supply of the steam denotes that at least one of a water supply passage connected to the evaporator and a steam supply passage (for example, a passage between an evaporator 106 and a reformer 108) connected to the reformer is blocked by a block function of the water supply unit.

The steam supply unit is configured to include, for example, a water flow rate adjuster, an evaporator (for example, the evaporator 106), and an on-off valve disposed between the water flow rate adjuster and the evaporator. A heat supply source for the evaporator may be a combustor. In this case, a water supply pump (for example, a plunger pump or a diaphragm pump) or a flow rate control valve used as a water flow rate adjuster functions to block the supply of the water even if the internal pressure of the reformer becomes positive or negative pressure with respect to the atmospheric pressure. Therefore, the above on-off valve can be omitted. However, the present invention is not limited to this configuration. As long as the steam can be supplied, for example, the evaporator may be configured to include a water tank, a heater (for example, an electrical heater or a combustor) configured to heat the water tank, and an on-off valve disposed on the steam supply passage extending between the water tank and the reformer.

The raw material supply unit is configured to include a raw material flow rate adjuster and an on-off valve. As the raw material flow rate adjuster, a flow rate control valve may be further included downstream of a pressure increasing device, or only the flow rate control valve may be included instead of the pressure increasing device. Moreover, the pressure increasing device (for example, a plunger pump or a diaphragm pump) or the flow rate control valve functions to block the supply of the raw material even if the internal pressure of the reformer becomes positive or negative pressure with respect to the atmospheric pressure. Therefore, the above on-off valve can be omitted.

The reformer is a gas passage containing a reforming catalyst.

The reforming catalyst is, for example, a material which catalyzes the steam-reforming reaction of generating the hydrogen-containing gas from the raw material and the steam. Examples of the reforming catalyst are a ruthenium-based catalyst in which alumina that is a catalyst carrier supports ruthenium (Ru) of several percents and a nickel-based catalyst in which the same catalyst carrier supports nickel (Ni) of several percents.

The controller is constituted by a CPU, a microprocessor, or the like. For example, the controller may be constituted by one CPU (centralized control) or may be constituted by a plurality of CPUs (distributed control).

The closing unit closes a gas passage provided downstream of the reformer. For example, in the hydrogen generator of Embodiment 1, a third on-off valve 116 and a seventh on-off valve 118 serve as the closing unit. In the fuel cell system of Embodiment 2, a fourth on-off valve 216 and a fifth on-off valve 232 serve as the closing unit.

The pressure compensating operation denotes that for example, after the start of the stop process of the hydrogen generator or the fuel cell system, the gas is supplied to the inside of the reformer to compensate the pressure decrease caused by the decrease in the internal temperature of the reformer. The above expression "the gas is supplied to compensate the pressure decrease" does not denote that the gas is supplied to completely compensate the reduced pressure but denotes that the gas, the amount of which compensates at least a part of the pressure decrease before the decreased pressure exceeds a negative pressure limit of the hydrogen generator, is supplied. More specifically, for example, when the pressure detected by a pressure detector configured to detect the internal pressure of the reformer becomes equal to or lower than a first pressure threshold that is higher than the negative pressure limit, the gas is supplied to the inside of the reformer such that the pressure detected by the pressure detector becomes equal to or higher than a second pressure threshold that is higher than the first pressure threshold. As the pressure detector, a pressure detector configured to directly detect the pressure in the reformer may be used, or a pressure detector (for example, a temperature detector 110) configured to indirectly detect the internal pressure of the reformer may be used.

A second hydrogen generator is configured such that in the first hydrogen generator, to compensate the pressure decrease in the reformer due to the temperature decrease in the reformer after the closing of the closing unit, the controller executes a first pressure compensating operation of supplying the steam from the steam supply unit to the reformer in a case where a temperature of the reforming catalyst is a temperature at which carbon in the raw material deposits on a surface of the reforming catalyst when the raw material flows through the reforming catalyst, and the controller executes a second pressure compensating operation of supplying the raw material from the raw material supply unit to the reformer in a case where the temperature of the reforming catalyst is a temperature at which the carbon in the raw material does not deposit on the surface of the reforming catalyst when the raw material flows through the reforming catalyst.

A method for supplying the steam to the inside of the reformer in the first pressure compensating operation is a method for opening the on-off valve provided between the water flow rate adjuster and the evaporator, activating the water flow rate adjuster, and supplying the water to the evaporator having remaining heat to generate the steam. However, the present invention is not limited to this. For example, in a case where the steam supply unit is configured to include a water tank, a heater, and an on-off valve provided between the evaporator and the reformer, the steam may be supplied to the reformer by opening the on-off valve. In this case, to generate the steam to be supplied to the reformer, the heater is controlled to suitably operate even after the stop of the hydrogen generating operation of the hydrogen generator.

In a case where a raw material supply source, such as a raw material infrastructure (for example, a city gas supply line) or a raw material bomb (for example, a propane gas bomb), has supply pressure, the supply of the raw material to the reformer in the second pressure compensating operation is normally carried out by opening the on-off valve. In a case where the on-off valve is not included, as the pressure compensating operation, the raw material flow rate adjuster is suitably operated to supply the raw material to the inside of the reformer.

The temperature at which the carbon in the raw material deposits on the surface of the reforming catalyst changes depending on the type of the catalyst, the composition of the gas flowing through the surface of the catalyst, and the like. As a method for specifying the above temperature, for example, after the raw material flows through the catalyst at a predetermined temperature, the catalyst is combusted by high-frequency heating in an oxygen stream, and the amount of carbon deposited on the catalyst is quantitated by infrared absorption. With this, whether or not the carbon is deposited can be determined. The experiments are carried out while changing the predetermined temperature. Thus, the temperature at which the carbon deposits can be specified. For example, EMIA-920V produced by Horiba, Ltd. can be used as a device for quantitating the deposited carbon by the infrared absorption.

A third hydrogen generator is configured such that in the first or second hydrogen generator, the controller executes the pressure compensating operation each time the temperature decrease in the reformer proceeds.

In accordance with this configuration, since the pressure compensation is carried out many times little by little before the internal pressure excessively decreases, damages on the hydrogen generator by the negative pressure can be suppressed.

A fourth hydrogen generator is configured such that in any one of the first to third hydrogen generators, the steam supply unit includes a water supply unit and an evaporator configured to evaporate water supplied from the water supply unit, and the controller causes the water supply unit to supply the water for generation of the steam, the amount of which compensates at least the pressure decrease in the reformer due to the temperature decrease in the reformer.

In accordance with this configuration, the evaporator generates the steam for compensating at least the pressure decrease in the reformer due to the temperature decrease, and this steam is supplied to the inside of the reformer. Therefore, for example, damages on the hydrogen generating unit by the pressure difference between the inside of the reformer and the outside air are suppressed.

A fifth hydrogen generator further includes, in any one of the first to fourth hydrogen generators, a depressurizing unit configured to release to atmosphere a part of pressure of the steam supplied to the reformer when the pressure compensating operation is executed.

When the water is supplied from the water supply unit to the evaporator in the pressure compensating operation, the steam pressure higher than the reduced pressure in the reformer may be supplied due to the magnitude of the volume expansion rate of the water. However, in accordance with this configuration, the excessive pressure increase in the reformer can be suppressed.

As the depressurizing unit, a valve including a mechanism which opens in accordance with the pressure increase in the closed space containing the reformer may be used. Examples are a relief valve and a solenoid valve having a spring sealing mechanism. Moreover, when the pressure increase in the closed space is detected by the pressure detector, the solenoid valve may open by the controller.

The position of the depressurizing unit may be anywhere, but examples are a passage (for example, the bypass passage 128) located downstream of the reformer, a passage (for example, a raw material gas supply passage 122 or a gas supply passage 125 shown in FIG. 3(a)) extending between the reformer and the raw material supply unit, and a passage (for example, a water supply passage 124 or the gas supply passage 125 located upstream of a meeting point of the gas supply passage 125 and the raw material gas supply passage 122 shown in FIG. 3(b)) extending between the reformer and the steam supply unit.

A sixth hydrogen generator may further include, in any one of the first to fifth hydrogen generators, a discharge passage through which a gas containing the steam discharged from the depressurizing unit flows; and a cooler disposed on the discharge passage.

In accordance with this configuration, the high-temperature gas containing the steam is not directly discharged to the atmosphere but is cooled down by the cooler to be then discharged. Therefore, this configuration is preferable from the viewpoint of safety.

Examples of the cooler are a radiator configured to perform heat release by a cooling fan and a heat exchanger configured to perform heat exchange with a cooling medium.

A seventh hydrogen generator further includes, in any one of the first to sixth hydrogen generators, a discharge passage through which the gas containing the steam discharged from the depressurizing unit flows; a combustor configured to heat the reformer; and an air supply unit configured to supply combustion air to the combustor, wherein: the discharge passage communicates with the combustor; and the controller causes the air supply unit to operate in the pressure compensating operation.

In accordance with this configuration, the gas containing the steam discharged from the depressurizing unit is diluted by the gas supplied from the air supply unit, and is then discharged to the atmosphere. Therefore, in a case where the combustible gas and carbon monoxide remaining in the hydrogen generator are contained in the gas containing the steam, these are diluted and then discharged, which is more preferable.

The configuration in which "the discharge passage communicates with the combustor" may be any configuration as long as the gas discharged through the discharge passage can be diluted by the air supplied from the air supply unit. Examples of the configuration are a configuration in which the discharge passage is a passage (for example, the bypass passage 128) through which the gas discharged from the reformer is supplied to the combustor and a configuration in which the discharge passage is a passage (for example, the branch passage 230) connected to a water tank (for example, the water tank 220) configured to store the condensed water from the flue gas in the flue gas passage.

A first fuel cell system includes any one of the first to seventh hydrogen generators and a fuel cell configured to generate electric power by using the hydrogen-containing gas supplied from the hydrogen generator.

A first method for operating a hydrogen generator including a steam supply unit and a reformer including a reforming catalyst and configured to generate a hydrogen-containing gas by using a raw material and steam includes the steps of (a) executing a sealing operation in which during stop of the hydrogen generator, with hydrogen contained in the reformer, communication between a gas passage containing at least the reforming catalyst and atmosphere is blocked to seal the reformer; and (b) executing a pressure compensating operation in which to compensate a pressure decrease in the reformer due to a temperature decrease in the reformer after the sealing operation, with the hydrogen contained in the reformer, the steam is supplied from the steam supply unit to the reformer.

A second method for operating a hydrogen generator further includes the step of, in the first method, (c) to compensate the pressure decrease in the reformer due to the temperature decrease in the reformer after the sealing operation, executing a first pressure compensating operation of supplying the steam to the reformer in a case where a temperature of the reforming catalyst is a temperature at which carbon in the raw material deposits on a surface of the reforming catalyst when the raw material flows through the reforming catalyst, and executing a second pressure compensating operation of supplying the raw material to the reformer in a case where the temperature of the reforming catalyst is a temperature at which the carbon in the raw material does not deposit on the surface of the reforming catalyst when the raw material flows through the reforming catalyst.

Embodiment 1

Hereinafter, a hydrogen generator of Embodiment 1 of the present invention will be explained in reference to the drawings.

Details of Device Configuration

Hereinafter, details of the device configuration of a hydrogen generator 100 of the present embodiment will be explained in reference to FIG. 1.

Used as a raw material flow rate adjuster 102 is, for example, a booster pump. The raw material flow rate adjuster 102 includes a raw material inlet connected to a raw material gas supply source (for example, a city gas supply line). The raw material flow rate adjuster 102 includes a raw material outlet connected to the reformer 108 via the raw material gas supply passage 122. A first on-off valve 103 (constituted by, for example, a solenoid valve) is disposed on the raw material gas supply passage 122 located downstream of the raw material flow rate adjuster 102.

Used as a water flow rate adjuster 104 is, for example, a flow rate control valve. The water flow rate adjuster 104 has an upstream end connected to a reforming water supply source (for example, a tap water supply line). The water flow rate adjuster 104 has a water outlet connected to the evaporator 106 via the water supply passage 124. A second on-off valve 105 (constituted by, for example, a solenoid valve) is disposed on the water supply passage 124.

The evaporator 106 is, for example, a spiral passage provided adjacent to a flue gas passage 130. The evaporator 106 is configured to generate steam by evaporating water, supplied from the water flow rate adjuster 104, by heat supplied from a flue gas. The evaporator 106 has an outlet connected to the reformer 108.

A hydrogen generating unit 101 includes the reformer 108 containing a reforming catalyst 109. The hydrogen generating unit 101 is configured such that a hydrogen-containing gas itself generated in the reformer 108 is ejected from the hydrogen generating unit 101. As a carbon monoxide reducing unit provided downstream of the reformer 108 and configured to reduce carbon monoxide in the hydrogen-containing gas discharged from the reformer 108, the hydrogen generating unit 101 may include a shift converter, not shown, containing a shift catalyst (for example, a copper-zinc-based catalyst), a carbon monoxide remover containing an oxidation catalyst (for example, a ruthenium-based catalyst) or a methanation catalyst (for example, a ruthenium-based catalyst), or the like.

The hydrogen generating unit 101 has a hydrogen-containing gas outlet connected to a hydrogen utilizing device 150 via a fuel gas supply passage 126.

The third on-off valve 116 (constituted by, for example, a solenoid valve) is disposed on the fuel gas supply passage 126. A bypass passage 128 branches from a portion of the fuel gas supply passage 126, bypasses the hydrogen utilizing device 150, and is connected to a combustor 112. The seventh on-off valve 118, which also serves as a depressurizing unit, is disposed on the bypass passage 128. Here, used as the seventh on-off valve is, for example, a solenoid valve which includes a spring sealing mechanism and is provided so as to cancel sealing of the spring sealing mechanism when internal pressure of a closed space containing the reformer 108 is a first upper pressure limit or higher. Especially, a solenoid valve whose cracking pressure (pressure necessary to open a valve) is set to 50 kPa is preferably used. With this configuration, as with a relief valve, a depressurizing mechanism capable of mechanistically carrying out a depressurizing operation without electrical control can be obtained.

A gas-liquid separator 120 is disposed on a portion of the bypass passage 128, the portion extending between the seventh on-off valve 118 and the combustor 112. Gas components separated in the gas-liquid separator 120 are supplied to the combustor 112. Liquid components separated in the gas-liquid separator 120 may be discarded to the outside of the hydrogen generator 100 (or the fuel cell system) or may be purified by, for example, an ion exchanger to be supplied to the water flow rate adjuster 104. The bypass passage 128 located downstream of the seventh on-off valve is open to the atmosphere through the combustor 112 and the flue gas passage 130.

An air supply unit 114 is connected to the combustor 112 via an air supply passage.

The combustor 112 is connected to the flue gas passage 130 formed to transfer heat to the reformer 108 via a dividing wall. Moreover, the flue gas passage 130 is formed to also transfer the heat to the evaporator 106 by using the heat of the flue gas flowing therethrough. Regarding how to heat the evaporator 106, the heat may be directly transferred via the dividing wall to the evaporator 106, or the heat may be indirectly transferred via the reformer 108 to the evaporator 106.

A cooler, not shown, configured to cool down the flue gas is disposed on a portion of the flue gas passage 130. The flue gas passage 130 has an outlet which is open to the outside of the hydrogen generator 100.

The temperature detector 110 is a detector configured to detect the temperature of the reformer 108 or the reforming catalyst 109 and is constituted by, for example, a temperature sensor, such as a thermistor, attached to an outer wall of the reformer 108. In this case, the temperature detector 110 transmits a detected temperature signal to a controller 140, and the controller 140 specifies the temperature of the reforming catalyst 109 based on the received temperature signal. Moreover, the temperature detector 110 also indirectly detects internal pressure of the reformer.

The controller 140 includes, for example, a CPU, an internal memory, a timer, a counter, and the like. The controller 140 is connected to the raw material flow rate adjuster 102, the water flow rate adjuster 104, the air supply unit 114, the temperature detector 110, the first on-off valve 103, the second on-off valve 105, the third on-off valve 116, the seventh on-off valve 118, and the like so as to be able to communicate with these.

The hydrogen utilizing device 150 of the present embodiment may be, for example, a hydrogen reservoir configured to store hydrogen therein. However, the present embodiment is not limited to this. The hydrogen utilizing device 150 may be any device as long as it utilizes the hydrogen. One example is a fuel cell.

Operation: Hydrogen Generating Operation

Hereinafter, an outline of operations at the time of a hydrogen generating operation of the hydrogen generator 100 will be explained. The controller 140 controls respective portions of the hydrogen generator 100 to execute the following operations.

In the hydrogen generating operation, the first on-off valve 103 and the second on-off valve 105 are open. A raw material gas is supplied through the raw material gas supply passage 122 to the reformer 108 by the raw material flow rate adjuster 102. Water is supplied through the water supply passage 124 to the evaporator 106 by the water flow rate adjuster 104. Combustion is performed in the combustor 112. The evaporator 106 generates the steam from the water, supplied from the water flow rate adjuster 104, by utilizing the heat (heat supplied from the flue gas passage 130 through which a high-temperature flue gas discharged from the combustor 112 flows) supplied from the combustor 112. Then, the evaporator 106 supplies the steam to the reformer 108.

As with the evaporator 106, the reformer 108 and the reforming catalyst 109 in the reformer 108 are heated by the combustor 112.

In the reformer 108, the hydrogen-containing gas (fuel gas) is generated from the raw material gas and the steam by a steam-reforming reaction.

In a start-up process of the hydrogen generator 100 before starting the hydrogen generating operation, the controller 140 maintains the closed state of the third on-off valve 116 and opens the seventh on-off valve 118 until the temperature of the reformer 108 increases to a stable temperature suitable for the reforming reaction. In this case, the gas ejected from the hydrogen generating unit 101 is supplied through the bypass passage 128 to the combustor 112 and is utilized as a combustion gas in the combustor 112. Then, after the temperature of the reformer 108 increases up to the stable temperature, the controller 140 opens the third on-off valve 116 while maintaining the open state of the seventh on-off valve, and the hydrogen-containing gas discharged from the reformer 108 is supplied through the fuel gas supply passage 126 to the hydrogen utilizing device 150. Thus, the hydrogen generating operation is executed.

Operation: Stop Process

Figure 2:
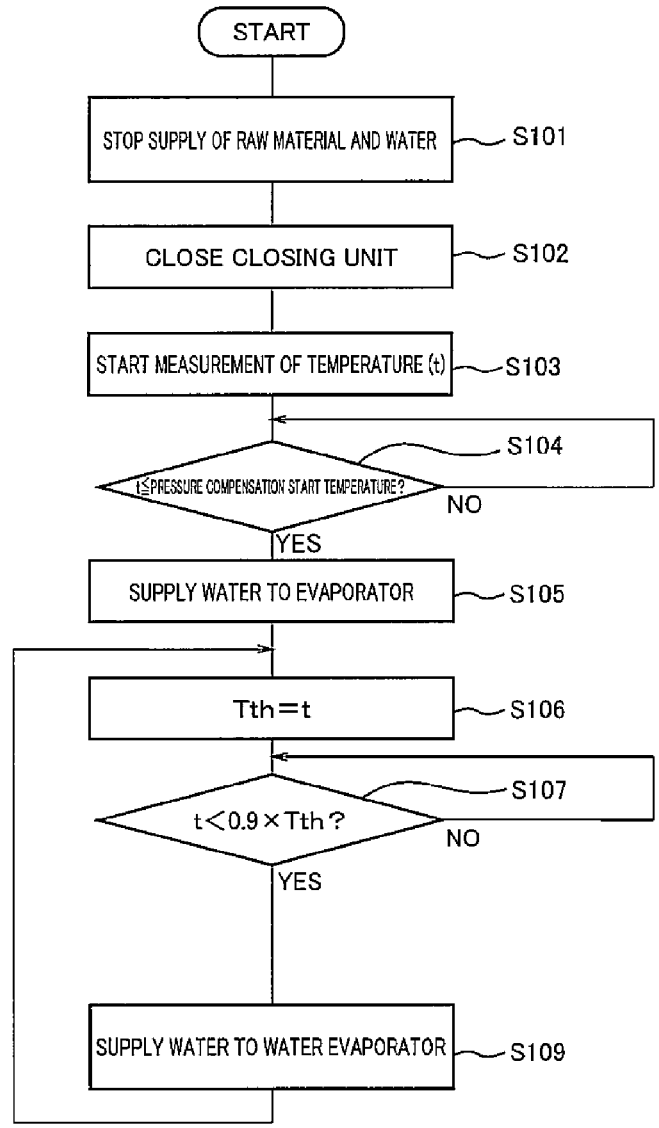
FIG. 2 is a flow chart showing one example of operations carried out when stopping the hydrogen generator of Embodiment 1 of the present invention.

FIG. 2 is a flow chart showing one example of operations carried out when stopping the hydrogen generator of Embodiment 1 of the present invention. Hereinafter, one example of the operations carried out when stopping the hydrogen generator 100 of the present embodiment will be explained in reference to FIG. 2. The controller 140 controls respective portions of the hydrogen generator 100 to execute the following operations.

When the stop process starts (START), the raw material flow rate adjuster 102 and the water flow rate adjuster 104 stop, and the first on-off valve 103, the second on-off valve 105, the third on-off valve 116, and the seventh on-off valve 118 are closed. With this, the supply of the raw material and the supply of the water to the hydrogen generating unit 101 stop, and the closing unit is in a closed state (Steps S101 and S102; a sealing operation of the hydrogen generator 100). With this, the inside of the reformer is sealed from the outside (atmosphere) with the hydrogen contained in the reformer. Instead of the second on-off valve 105, an on-off valve may be provided between the evaporator 106 and the reformer 108, and the supply of the steam may be blocked by closing this on-off valve. Alternatively, an on-off valve may be provided between the evaporator 106 and the reformer 108 in addition to the second on-off valve 105, and the supply of the steam may be blocked by closing one or both of the on-off valve and the second on-off valve 105.

Next, the measurement of a temperature (t) is started by using the temperature detector 110 (Step S403). Hereinafter, the measurement of the temperature (t) is carried out for every six seconds.

Next, whether or not the temperature t is a pressure compensation start temperature or lower (Step S104). In consideration of, for example, pressure resistance, durability, and the like of a casing portion and sealing portion of the reformer 108, the pressure compensation start temperature is suitably determined such that the reduction in the internal pressure of the reformer due to the decrease in temperature of the reformer 106 does not adversely affect on the performances of the reformer 108 and the hydrogen generator 100. For example, the pressure compensation start temperature may be set to about 450° C. When the determination result in Step S104 is NO, the process returns to Step S104.

When the determination result in Step S104 is YES, the second on-off valve 105 opens, so that the water is supplied through the water flow rate adjuster 104 to the evaporator 106 (Step S105). An operation of supplying the water to the evaporator 106 is carried out in the same manner as in the following explanation regarding the pressure compensating operation using the steam.

When Step S105 is completed, the temperature (t) at this time is temporarily stored as a threshold (Tth) (Step S106).

Next, whether or not the temperature (t) is lower than 0.9 time the threshold (Tth) is determined (Step S107). When the determination result in Step S107 is NO, the process returns to Step S107.

When the determination result in Step S107 is YES, the second on-off valve 105 opens, so that the water is supplied from the water flow rate adjuster 104 to the evaporator 106. With this, the pressure compensating operation of supplying the steam to the reformer 108 is carried out (Step S109), and the process returns to Step S106.

In the above pressure compensating operation, the steam is supplied to the reformer with the hydrogen existing in the reformer. Examples of a method for causing the hydrogen to exist in the reformer are a first method for sealing the hydrogen gas, existing in the reformer, in the reformer immediately after the start of the stop process of the hydrogen generator 100 and a second method for, although the hydrogen gas existing immediately after the start of the stop process of the hydrogen generator is discharged from the reformer, sealing the reformer with the raw material and the steam existing in the reformer, and carrying out the reforming reaction between the raw material and the steam by remaining heat of the reformer to generate the hydrogen.

As described above, the present embodiment uses the first method for stopping the raw material flow rate adjuster 102 and the water flow rate adjuster 104 and closing the first on-off valve 103, the second on-off valve 105, the third on-off valve 116, and the seventh on-off valve 118.

For example, the second method may be as follows. When stopping the operation of generating the hydrogen-containing gas by the hydrogen generator 100, first, the water flow rate adjuster 104 stops, and the second on-off valve 105 is closed. The open state of the seventh on-off valve 118 is maintained even after the supply of the water to the reformer 1 is stopped. Then, the gas in the hydrogen generating unit 101 is pushed out by the evaporation of the remaining water by the remaining heat of the evaporator 106 to be discharged to the combustor 112. Further, the operation of the raw material flow rate adjuster 102 and the open state of the first on-off valve 103 are maintained to continue the supply of the raw material to the reformer 108. At a time when the evaporation of the remaining water by the evaporator 106 is expected to be completed, the raw material flow rate adjuster 102 is stopped, and the first on-off valve 103 and the seventh on-off valve 118 are closed.

Each of the first method and the second method is designed such that the hydrogen, the amount of which is necessary to suppress the steam oxidation of the reforming catalyst, exists in the reformer. Specifically, in the case of the first method, problems do not especially occur as long as S/C (steam to carbon ratio) immediately before stopping the supply of the raw material and the water to the reformer is a value by which the steam oxidation of the reforming catalyst does not proceed. The second method is also designed such that the S/C of the raw material and steam remaining in the reformer when sealed becomes the value by which the steam oxidation of the reforming catalyst does not proceed. For example, it is preferable that the above value S/C be 10 or smaller (the mole number of water molecules/the mole number of carbon atoms). In consideration of suppressing of the carbon deposition on the reforming catalyst, it is further preferable that the above value S/C be 10. Each of the above two methods is one example of a process (hydrogen sealing process) of causing the hydrogen to exist in the sealed reformer 108. However, the present embodiment is not limited to the above two methods. Any method may be used as long as it is a method for causing the hydrogen to exist in the sealed reformer 108.

Moreover, to supply the water to the evaporator 106 in the pressure compensating operation, a predetermined amount of water is supplied through the water flow rate adjuster 104. If, for example, the water flow rate adjuster 106 is a pump, the pump is activated to supply the water to the evaporator 106. The amount of water supplied in Step S104 is set such that a pressure increase (volume increase by the steam generation) by the evaporation of the water into the steam compensates at least a pressure decrease in the reformer, the pressure decrease being caused by the temperature decrease of the reformer and being a decrease from a set pressure (second pressure threshold) which is a pressure recovered by the pressure compensating operation. The amount of steam supplied is set so as to compensate at least a decrease of the volume of the gas in the reformer in a case where the pressure in the reformer is converted into atmospheric pressure. For example, in a case where a CO reducer (a shift converter or a selective oxidizer) is provided downstream of the reformer, it is preferable that the amount of steam be set in consideration of the amount of steam used to compensate the pressure decrease of the CO reducer. To be specific, the amount of steam supplied may be set so as to compensate at least the decrease of the volume of the gas in the closed space including the reformer and sealed by the first on-off valve 103, the second on-off valve 105, the third on-off valve 116, and the seventh on-off valve 118, the volume being obtained in a case where the pressure in the closed space is converted into the atmospheric pressure.

As described above, in a case where the water is supplied through the water flow rate adjuster 104 to the evaporator 106 having the remaining heat, and the pressure compensation is carried out by the generated steam, the steam pressure higher than the reduced pressure in the reformer may be supplied due to the magnitude of the volume expansion rate of the water. Here, when the pressure in the reformer becomes the first upper pressure limit or higher, the seventh on-off valve 118 having the depressurizing function opens to discharge excessive pressure (depressurizing operation).

The gas discharged from the seventh on-off valve 118 in the depressurizing operation is generally a mixture gas of the hydrogen-containing gas and steam remaining in the reformer. Here, the air supply unit 114 is activated in the above first pressure compensating operation. With this, even if the mixture gas is discharged from the seventh on-off valve 118 due to the first pressure compensating operation, it is diluted by the air supplied from the air supply unit 114 and is then discharged.

In the above embodiment, when the pressure in the closed space containing the reformer reaches the first upper pressure limit or higher, the spring sealing mechanism of the solenoid valve as the depressurizing unit is deactivated. However, the seventh on-off valve 118 may open by the command from the controller 140 when a pressure detector, not shown, configured to detect the pressure in the closed space is provided, and the pressure detected by the pressure detector reaches the second upper pressure limit or higher. Further, the above embodiment is not limited to this. Without detecting the pressure in the closed space, the seventh on-off valve 118 may open in accordance with the first pressure compensating operation for a time in which at least the pressure which is excessive by the first pressure compensating operation can be released.

The above embodiment has adopted a mode in which the pressure compensation by the supply of the raw material is carried out as the second pressure compensating operation. However, the above embodiment may adopt a mode in which: a gas supply unit configured to supply the other gas (for example, inactive gas, such as nitrogen) is provided; and the gas supply unit supplies the gas to the inside of the reformer.

Moreover, in the above embodiment, the first pressure compensating operation and the second pressure compensating operation are switched based on a high-low relation between the temperature t and a pressure compensation switching temperature. However, in the above embodiment, only the first pressure compensating operation may be executed. In this case, the first pressure compensating operation may be executed when the temperature of the evaporator 106 or the reformer 108 is a temperature (for example, 100° C. or higher) at which the water supplied from the water flow rate adjuster 104 boils, and the pressure compensating operation may not be executed when the temperature of the evaporator 106 or the reformer 108 is a temperature (for example, lower than 100° C.) at which the water supplied from the water flow rate adjuster 104 do not boil. However, in this case, the steam pressure is supplied by the last pressure compensating operation such that the pressure decrease of the reformer by the temperature decrease of the reformer in a temperature range in which the first pressure compensating operation is not executed does not exceed the upper limit of the negative pressure resistance of the reformer.

Modification Example 1

Figure 3:
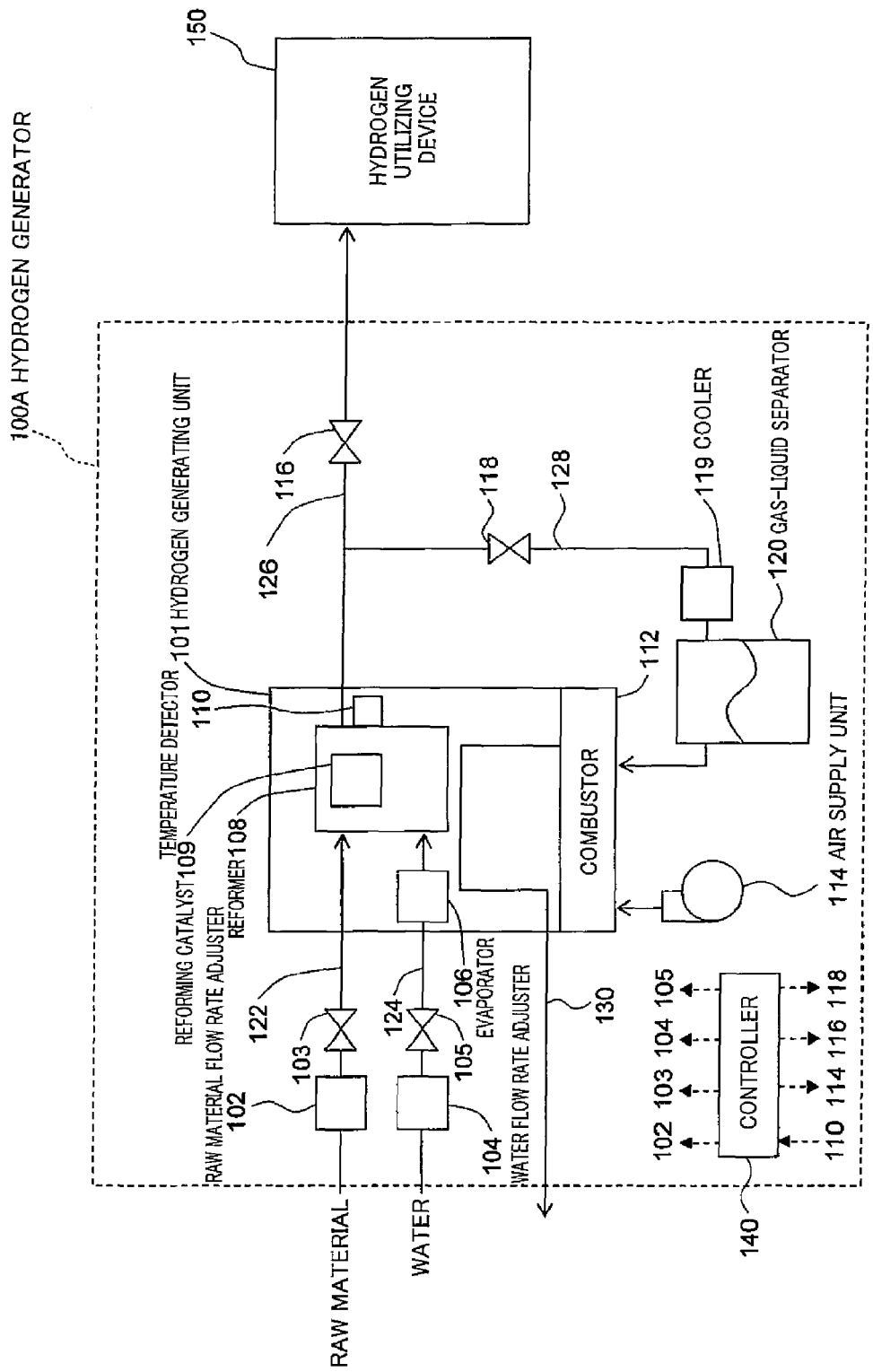
FIG. 3 is a block diagram showing one example of a schematic configuration of the hydrogen generator according to Modification Example 1 of Embodiment 1 of the present invention.

FIG. 3 is a block diagram showing one example of a schematic configuration of the hydrogen generator according to Modification Example 1 of Embodiment 1 of the present invention. A hydrogen generator 100A of Modification Example 1 is the same in configuration as the hydrogen generator 100 of Embodiment 1 except that a cooler 119 is disposed on the bypass passage 128 of FIG. 1 so as to be located between the seventh on-off valve 118 and the gas-liquid separator 120. Therefore, explanations of the components other than the cooler 119 are omitted.

The cooler 119 cools down the gas, flowing through the bypass passage 128, to condense the steam contained in the gas into a liquid, that is, water. Since the cooler 119 cools down the gas, it is possible to prevent high-temperature steam from being discharged through an exhaust port.

Since the operations of the hydrogen generator 100A of Modification Example 1 are the same as those of the hydrogen generator 100, explanations thereof are omitted.

The cooler 119 may be a radiator, a heat exchanger, or the like.

Although not essential, it is preferable that in the hydrogen generator of Modification Example 1, the cooler 119 operate during at least the pressure compensating operation. This is because it is possible to suppress the discharging of the high-temperature steam through the exhaust port when the steam corresponding to the excessive pressure at the time of the pressure compensation is discharged from the depressurizing unit 118. For example, it is preferable that in a case where the cooler 119 is a heat exchanger for recovering exhaust heat, an operation of circulating a heat medium in an exhaust heat recovery passage be executed.

Modification Example 2

Figure 4:
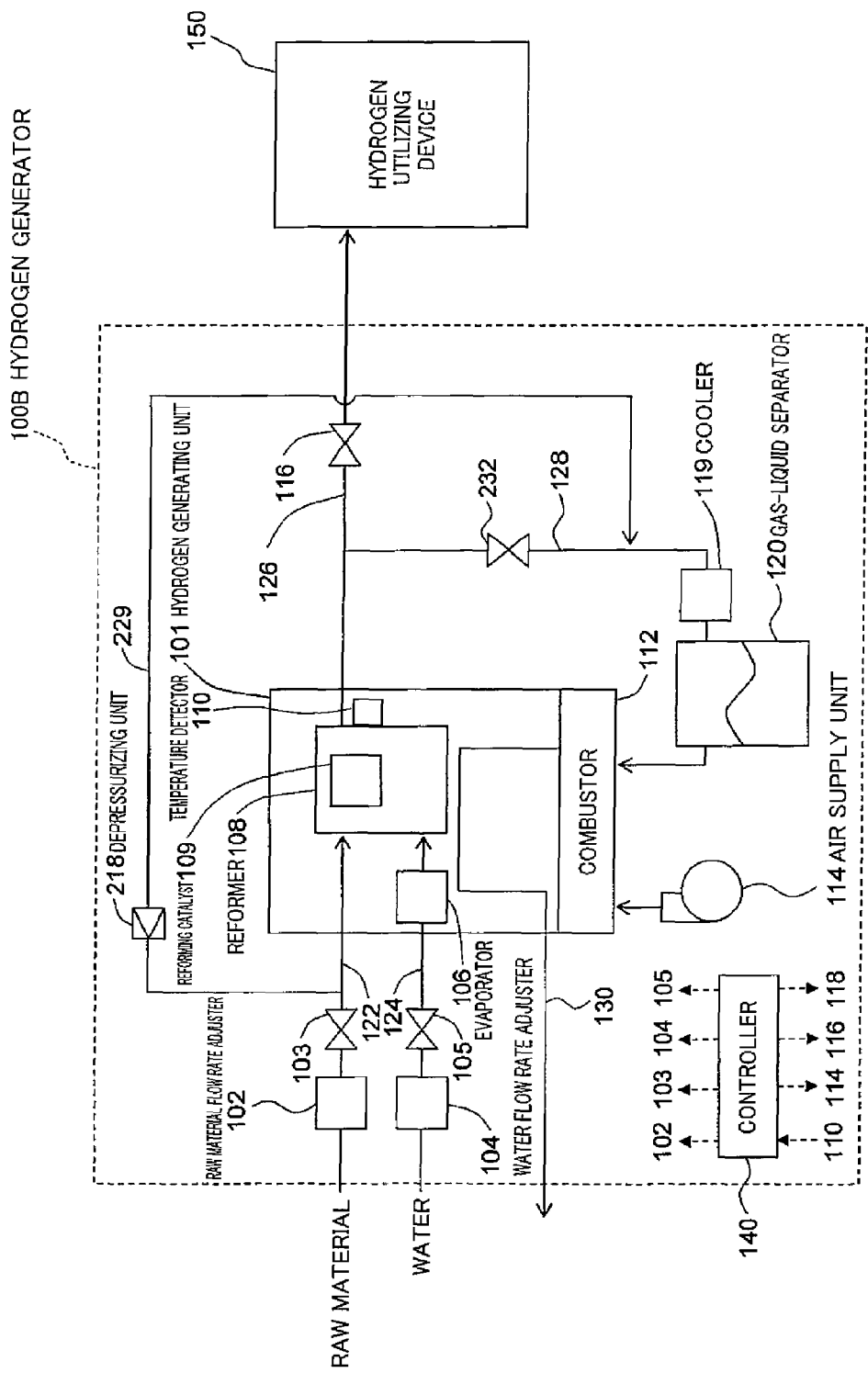
FIG. 4 is a block diagram showing one example of a schematic configuration of the hydrogen generator according to Modification Example 2 of Embodiment 1 of the present invention.

FIG. 4 is a block diagram showing one example of a schematic configuration of the hydrogen generator according to Modification Example 2 of Embodiment 1 of the present invention. The hydrogen generator 100B of Modification Example 2 is configured such that in the hydrogen generator 100A of Modification Example 1 shown in FIG. 3, the seventh on-off valve 118 is replaced with the fifth on-off valve 232, the function of the seventh on-off valve as the depressurizing unit is realized by a depressurizing unit 218 disposed on a branch passage 229 branching from the raw material gas supply passage 122 extending between the first on-off valve 103 and the reformer 108, and the branch passage 229 is connected to the bypass passage 128 extending between the fifth on-off valve 232 and the cooler 119. To be specific, unlike the hydrogen generator 100 of Embodiment 1 in which the depressurizing unit is disposed on the gas passage located downstream of the reformer, the hydrogen generator 100B of Modification Example 2 is configured such that the depressurizing unit is disposed on the gas passage located upstream of the reformer. The same reference signs and names are used for the same components between FIGS. 4 and 3, and explanations thereof are omitted.

In Modification Example 2, for example, each of the third on-off valve 116 and the fifth on-off valve 232 serves as the closing unit.

The depressurizing unit 218 of Modification Example 2 is provided upstream of the reformer 108. The depressurizing unit 218 is a relief valve configured to mechanistically open when the pressure in the closed space containing the reformer 108 is a third upper pressure limit or higher. For example, a relief valve whose cracking pressure (pressure necessary to open a valve) is set to 50 kPa is used. Instead of the relief valve, a solenoid valve may be used, which cancels the sealing of a spring sealing mechanism thereof when the internal pressure in the closed space containing the reformer 108 is the first upper pressure limit or higher. The gas (gas supplied to the gas-liquid separator 120) discharged when the internal pressure in the closed space reaches the third upper pressure limit or higher by the pressure compensating operation is mainly the steam.

The fifth on-off valve 232 is constituted by, for example, a solenoid valve.

In Modification Example 2, the branch passage 229 located downstream of the depressurizing unit 218 is open to the atmosphere through the bypass passage 128 (including the cooler 119 and the gas-liquid separator 120), the combustor 112, and the flue gas passage 130.

Since the operations of the hydrogen generator 100B of Modification Example 2 are the same as those of the hydrogen generator 100 except that the seventh on-off valve 118 is replaced with the fifth on-off valve 232, explanations thereof are omitted.

In Modification Example 2, the gas from the depressurizing unit 218 is discharged through the bypass passage 128 and the cooler 119 to the gas-liquid separator 120. However, the destination to which the gas from the depressurizing unit 218 is discharged is not especially limited. To be specific, a portion to which a downstream end portion of the branch passage 229 is connected is not limited to the bypass passage 128 extending between the fifth on-off valve 232 and the cooler 119.

The following will explain some configuration examples which are adoptable when the depressurizing unit is provided upstream of the reformer 108.

FIGS. 5(a) and 5(b) are block diagrams each showing a modification example of the positional relation among the raw material supply unit, the water supply unit, the evaporator, and the depressurizing unit in the hydrogen generator of Modification Example 2.

FIG. 5(a) shows a configuration example in which a group of the raw material flow rate adjuster 102 and the first on-off valve 103 and a group of the water flow rate adjuster 104 and the second on-off valve 105 are connected to the evaporator 106 so as to be parallel to each other. In this case, the depressurizing unit may be disposed on any one of the gas supply passage 125 (position A in FIG. 5(a)) that is a passage between the evaporator 106 and the reformer 108, the raw material gas supply passage 122 (position B in FIG. 5(a)) that is a passage between the first on-off valve 103 and the evaporator 106, and the water supply passage 124 (position C in FIG. 5(a)) that is a passage between the second on-off valve 105 and the evaporator 106.

FIG. 3(b) shows a configuration example in which the group of the water flow rate adjuster 104 and the second on-off valve 105, the evaporator 106, and the reformer 108 are connected in series, and a gas outlet of the group of the raw material flow rate adjuster 102 and the first on-off valve 103 is connected to a portion between the evaporator 106 and the reformer 108. In this case, the depressurizing unit may be disposed on any one of the gas supply passage 125 (position D in FIG. 5(b)) that is a passage between the evaporator 106 and the reformer 108, the raw material gas supply passage 122 (position E in FIG. 5(b)) that is a passage between the first on-off valve 103 and the gas supply passage 125, and the water supply passage 124 (position F in FIG. 5(b)) that is a passage between the second on-off valve 105 and the evaporator 106.

Figure 5:
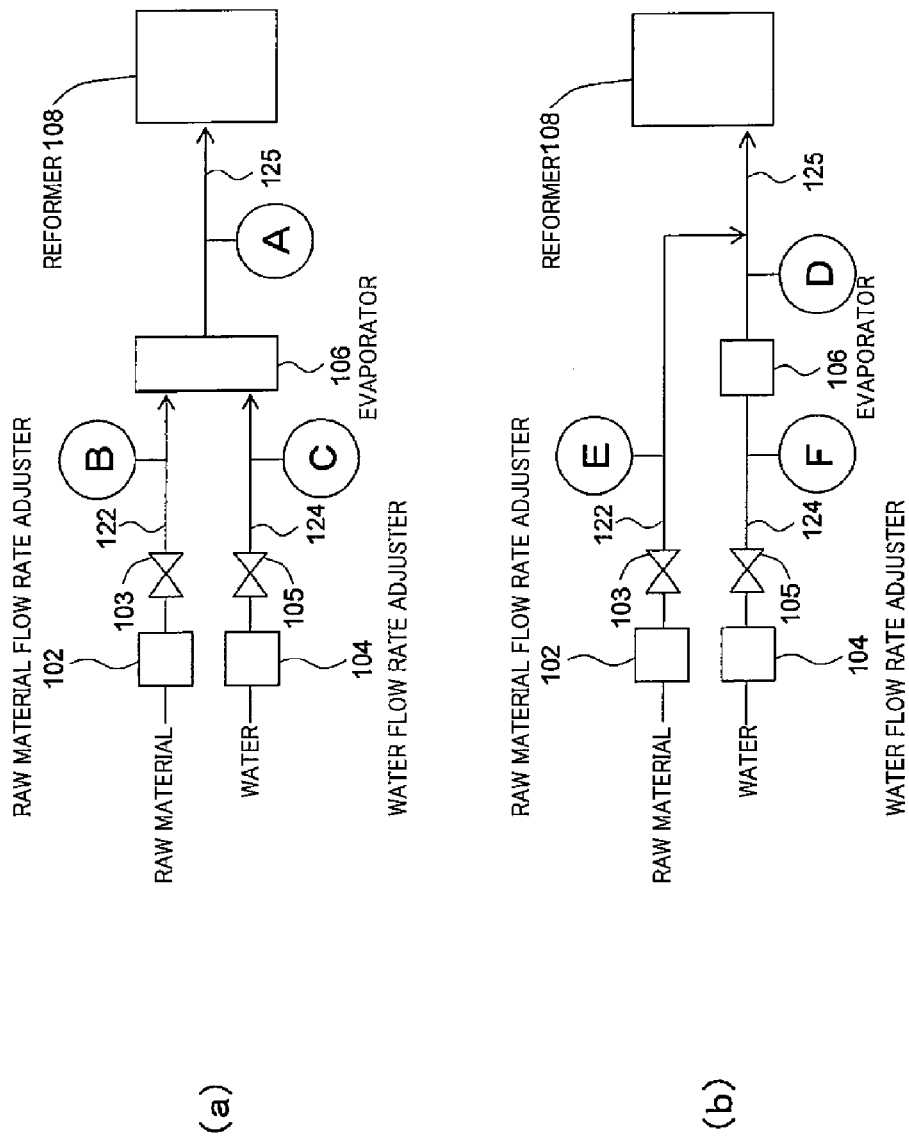
FIGS. 5(a) and 5(b) are block diagrams each showing a modification example of a positional relation among a raw material supply unit, a water supply unit, an evaporator, and a depressurizing unit.

In a case where the depressurizing unit is provided upstream of the reformer 108 as shown in FIG. 5, the gas discharged when the steam pressure becomes equal to or higher than a set pressure of the depressurizing unit in the pressure compensating operation is mainly the steam. Moreover, in this pressure compensating operation, the hydrogen exists in the reformer.

Modification Example 3

Figure 6:
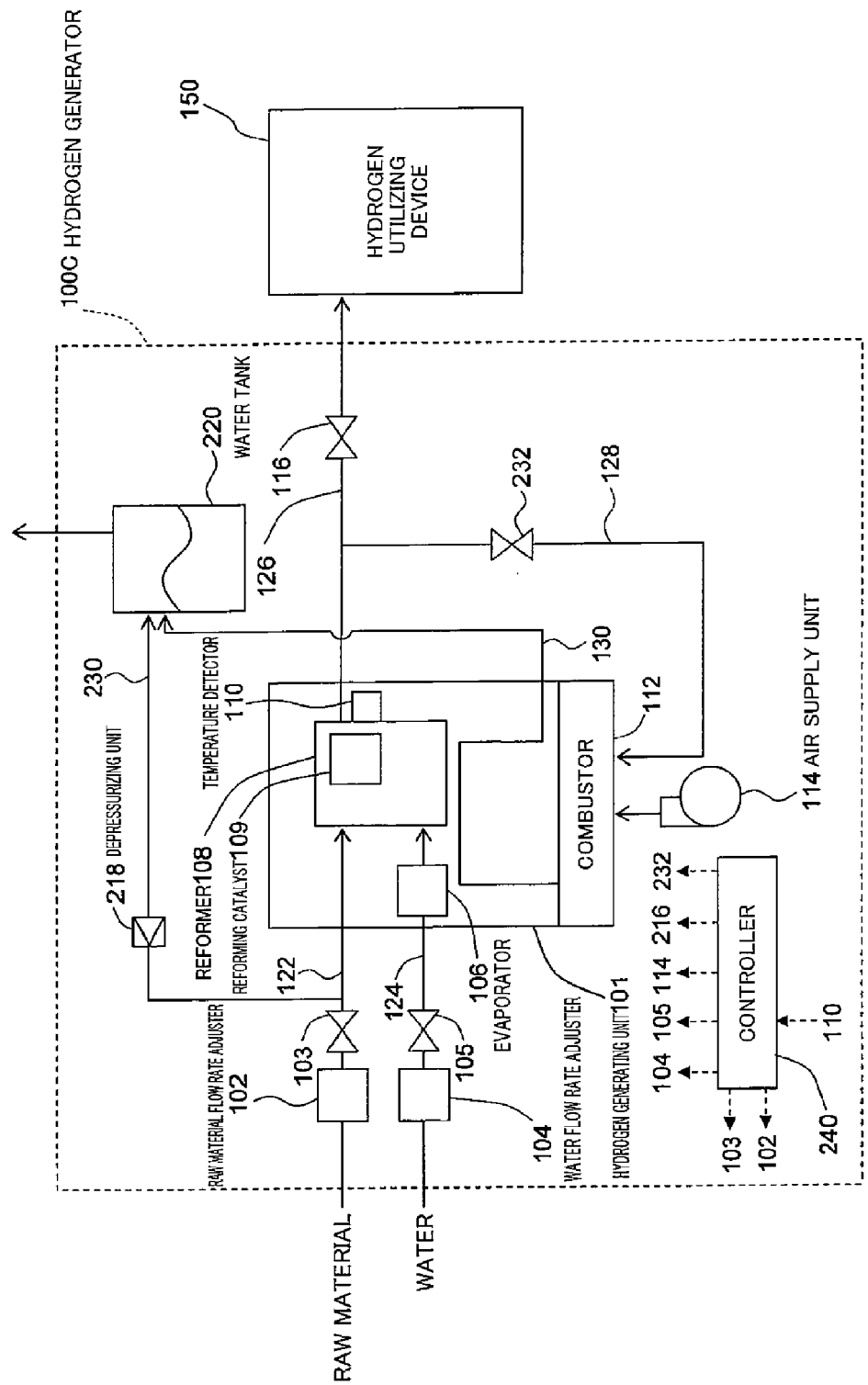
FIG. 6 is a block diagram showing one example of a schematic configuration of the hydrogen generator according to Modification Example 3 of Embodiment 1 of the present invention.

FIG. 6 is a block diagram showing one example of a schematic configuration of the hydrogen generator according to Modification Example 3 of Embodiment 1 of the present invention. The hydrogen generator 100C of Modification Example 3 is configured such that in the hydrogen generator 100B of Modification Example 2 shown in FIG. 4, the cooler 119 and the gas-liquid separator 120 are omitted, the flue gas passage 130 is connected to a water tank 220, and a branch passage 230 is formed instead of the branch passage 229 and connected to the water tank 220. The water tank 220 is open to the atmosphere. The depressurizing unit 218 is disposed on the branch passage 230. The same reference signs and names are used for the same components between FIGS. 6 and 4, and explanations thereof are omitted.

In Modification Example 3, the branch passage 230 located downstream of the depressurizing unit 218 is open to the atmosphere through the water tank 220.

The water tank 220 is configured to communicate with the flue gas passage 130 such that condensed water flowing through the flue gas passage 130 flows into the water tank 220.

The water tank 220 and the water flow rate adjuster 104 may be connected to each other such that the water in the water tank 220 returns to the water flow rate adjuster 104 to be reused.

A cooler similar to the cooler 119 may be disposed on the branch passage 230 extending between the depressurizing unit 218 and the water tank 220. By disposing a cooler on the flue gas passage 130 and connecting the downstream end of the branch passage 230 to the flue gas passage 130 located upstream of the cooler, the cooler may cool down not only the gas flowing through the branch passage 230 but also the flue gas flowing through the flue gas passage 130. Moreover, in this configuration, as with the hydrogen generator of Modification Example 1, the cooling operation of the cooler may be executed in at least the pressure compensating operation.

Since the operations of the hydrogen generator 100C of Modification Example 3 are the same as those of the hydrogen generator 100 except that the seventh on-off valve 118 is replaced with the fifth on-off valve 232, explanations thereof are omitted.

Embodiment 2

In Embodiment 1, only the pressure compensation using the steam is carried out. Embodiment 2 is different from Embodiment 1 in that the pressure compensation using the steam and the pressure compensation using the raw material are selectively executed depending on temperatures.

Since the device configuration (hardware configuration) of the hydrogen generator in the present embodiment is the same as that of the hydrogen generator 100 of Embodiment 1, an explanation thereof is omitted. In addition, since the operations during the hydrogen generating operation in the present embodiment are the same as those in Embodiment 1, explanations thereof are omitted.

Figure 7:
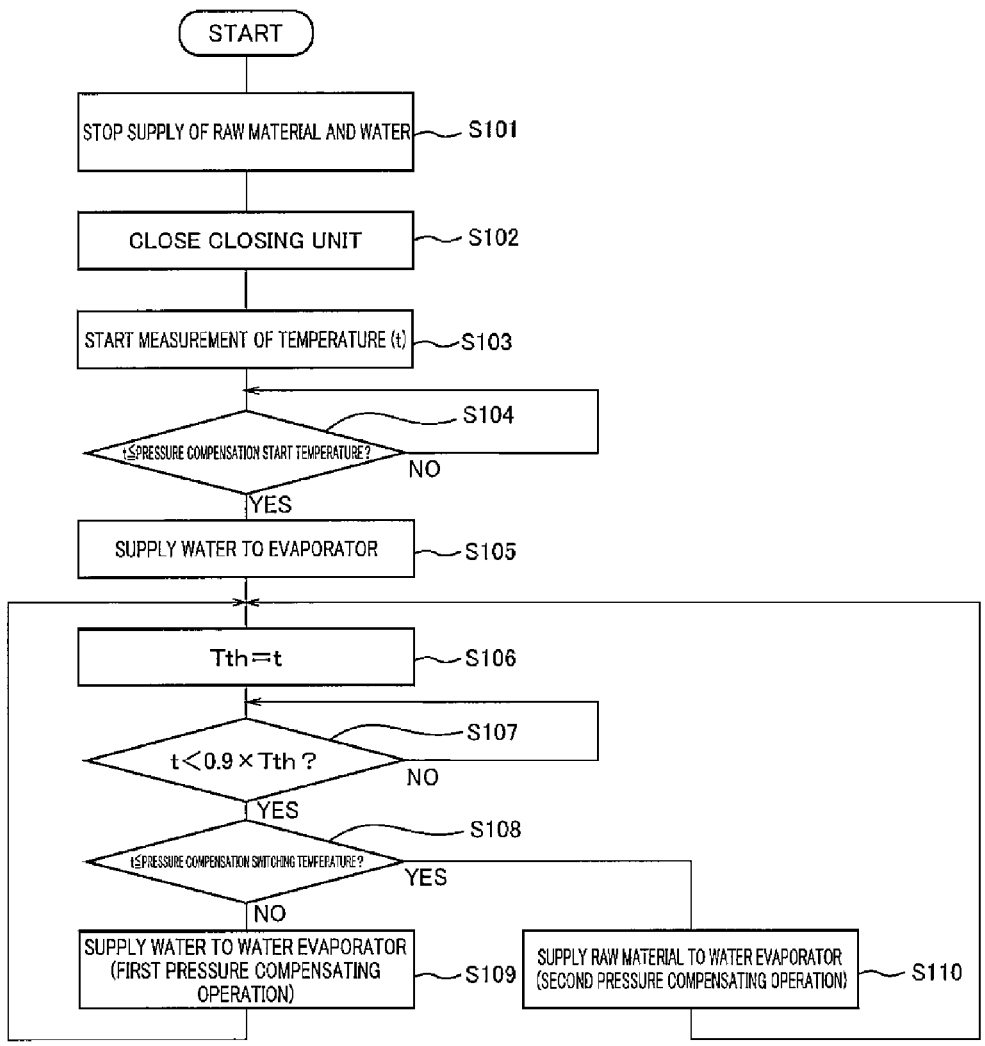
FIG. 7 is a flow chart showing one example of operations carried out when stopping the hydrogen generator of Embodiment 2 of the present invention.

FIG. 7 is a flow chart showing one example of operations carried out when stopping the hydrogen generator of Embodiment 2 of the present invention. The operations carried out when stopping the hydrogen generator of the present embodiment are designed such that in FIG. 2, a determination operation of Step S108 is added between Steps S107 and S109, and Step S110 that is the pressure compensating operation using the raw material is further added. Since the operations from START to Step S107 are the same as those in Embodiment 1 (FIG. 2), explanations thereof are omitted.

When the determination result in Step S107 is YES, whether or not the temperature (t) is the pressure compensation switching temperature or lower is determined (Step S108). When the determination result in Step S108 is NO, the first pressure compensating operation is carried out (Step S109), that is, the second on-off valve 105 opens to supply the water through the water flow rate adjuster 104 to the evaporator 106, thereby supplying the steam to the reformer 108. Then, the process returns to Step S106. When the determination result in Step S108 is YES, the second pressure compensating operation is carried out (Step S110), that is, the raw material is supplied through the raw material flow rate adjuster 102 to the reformer 108. Then, the process returns to Step S106.

The pressure compensation switching temperature is suitably set based on, for example, the type of the reforming catalyst such that the performance of the catalyst does not deteriorate (such that when the raw material flows through the reforming catalyst 109, carbon in the raw material does not deposit on the surface of the reforming catalyst 109). For example, when a nickel-based catalyst is used as the reforming catalyst, and the temperature of the nickel-based catalyst is higher than 300° C., and the raw material flows through the reforming catalyst, carbon may deposit on the surface of the catalyst, and this may deteriorate the performance of the catalyst. Therefore, it is preferable that in this configuration, the pressure compensation switching temperature be a predetermined temperature equal to or lower than 300° C. If the predetermined temperature is a temperature by which the temperature of the evaporator 106 becomes lower than 100° C., the water evaporation occurs less. Therefore, it is preferable that the predetermined temperature be a temperature by which the temperature of the evaporator 106 becomes 100° C. or higher. In the foregoing, the pressure compensation start temperature is 450° C. However, this value is just an example, and the present embodiment is not limited to this temperature. The pressure compensation start temperature is suitably set depending on the configuration of the hydrogen generator. For example, the pressure compensation start temperature is set to 550° C., and the reforming catalyst is a Ru-based catalyst whose carbon deposition start temperature is higher than that of a Ni-based catalyst. In this case, if the temperature of the reforming catalyst is higher than 500° C., the carbon deposition may occur. Therefore, when the temperature detected by the temperature detector 110 is higher than 500° C., the first pressure compensating operation is executed.

A control method during the pressure compensating operation is not limited to the method shown in FIG. 7. For example, it is effective to use a method for predetermining, based on experiments or the like, temperature conditions for determining respective execution timings of the first pressure compensating operation and the second pressure compensating operation and executing the respective pressure compensating operations by the controller 140 based on a table storing the above temperature conditions or a method for storing, as a time-temperature table, experimental results of time-lapse changes of the internal temperature of the reformer and executing the respective pressure compensating operations by the controller 140 based on this table and values of a timing device, not shown. To be specific, whether or not the temperature is a temperature at which carbon in the raw material flowing through the reforming catalyst 109 deposits on the surface of the reforming catalyst 109 and whether or not the temperature is a temperature at which carbon in the raw material flowing through the reforming catalyst 109 does not deposit on the surface of the reforming catalyst 109 may be determined by directly measuring the temperature of the reformer 108 or the reforming catalyst 109 or may be indirectly determined by measuring the pressure in the closed space containing the reformer or a time.

In the present embodiment, the possibility of the carbon deposition from the raw material gas can be made lower than before, and this can further improve the reliability of the reformer in the fuel cell system (that is, the reliability of the fuel cell system itself).

In Embodiment 2, the same modification examples as in Embodiment 1 can be realized.

Embodiment 3

Figure 8:
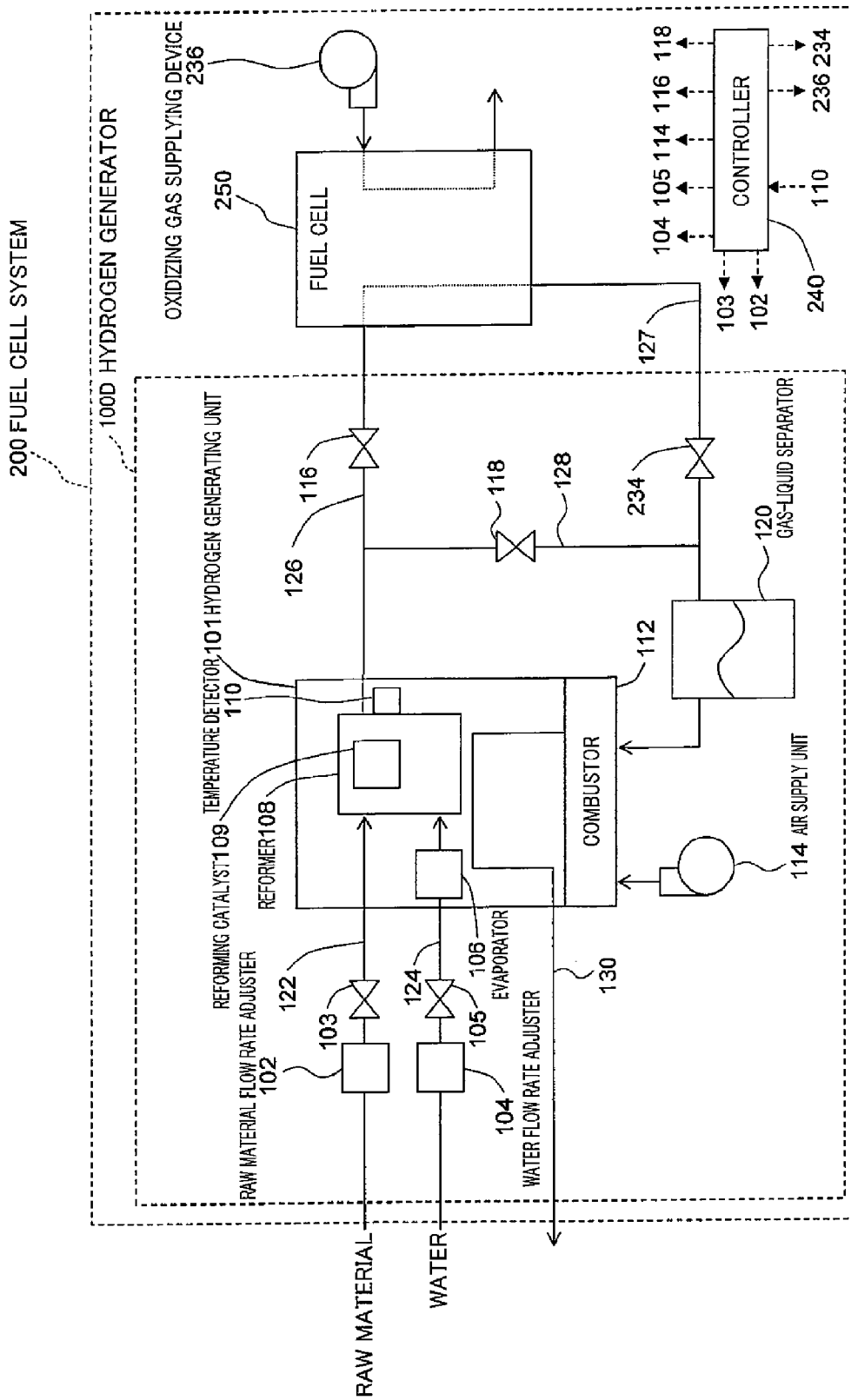
FIG. 8 is a block diagram showing one example of a schematic configuration each of a hydrogen generator and a fuel cell system according to Embodiment 3 of the present invention.

FIG. 8 is a block diagram showing one example of a schematic configuration of each of the hydrogen generator and fuel cell system of Embodiment 3 of the present invention. A fuel cell system 200 of the present embodiment includes a hydrogen generator 100D and a fuel cell 250 configured to generate electric power by using the hydrogen-containing gas supplied from the hydrogen generator 100D. The hydrogen generator 100D and its operating method of the present embodiment are substantially the same as the hydrogen generator 100 and its operating method of Embodiment 1. In the present embodiment, during the pressure compensating operation after the stop of the hydrogen generating operation of the hydrogen generator of the fuel cell system, the steam is supplied to the reformer with the hydrogen existing in the reformer.

Details of Device Configuration

Hereinafter, details of the device configuration of the hydrogen generator 100D will be explained in reference to FIG. 4.

The hydrogen generator 100D is configured such that in the hydrogen generator 100 of FIG. 1, a fuel off gas supply passage 127 is newly formed, the bypass passage 128 is connected to not the combustor 112 but the fuel off gas supply passage 127, and the gas-liquid separator 120 is disposed on not the bypass passage 128 but the fuel off gas supply passage 127. The other components of the hydrogen generator 100D are the same as those of the hydrogen generator 100. Therefore, the same reference signs and names are used for the corresponding components, and explanations thereof are omitted.

In the present embodiment, for example, each of the third on-off valve 116 and the seventh on-off valve 118 serves as the closing unit.

Next, details of the device configuration of the fuel cell system 200 will be explained in reference to FIG. 4.

The fuel cell 250 is configured such that a plurality of unit cells are connected in series. Each of the unit cells is configured such that a pair of bipolar plates that are separators sandwich a cathode which contains a platinum-based catalyst and causes an electrochemical reaction represented by Formula 1 below, an anode which contains a platinum-ruthenium-based catalyst and causes an electrochemical reaction represented by Formula 2 below, and a hydrogen-ion conductive polymer electrolyte through which hydrogen ions generated in the anode by Formula 2 are transferred to the cathode.

The bypass passage 128 bypasses the fuel cell 250 and connects a portion of the fuel gas supply passage 126 which portion is located between the reformer 108 and the third on-off valve 116 and a portion of the fuel off gas supply passage 127 which portion is located between a sixth on-off valve 234 and the gas-liquid separator 120. As with Embodiment 1, the seventh on-off valve 118 serves as both the closing unit and the depressurizing unit.

The sixth on-off valve 234 is constituted by, for example, a solenoid valve.

A oxidizing gas supplying device 236 is constituted by, for example, a fan or a blower, and supplies an oxidizing gas (for example, air) to the cathode of the fuel cell.

A controller 240 includes, for example, a CPU, an internal memory, a timer, a counter, and the like. The controller 240 is connected to the raw material flow rate adjuster 102, the water flow rate adjuster 104, the air supply unit 114, the temperature detector 110, the first on-off valve 103, the second on-off valve 105, the third on-off valve 116, the sixth on-off valve 234, the seventh on-off valve 118, the oxidizing gas supplying device 236, and the like so as to be able to communicate with these.

Operation: Electric Power Generating Operation

An outline of operations during the electric power generating operation of the fuel cell system 200 will be explained. The controller 240 controls respective portions of the fuel cell system 200 to execute the following operations.

In the electric power generating operation, the hydrogen generator 100D carries out the hydrogen generating operation. Since the operations during the hydrogen generating operation are the same as those of Embodiment 1, detailed explanations thereof are omitted.

In the electric power generating operation of the fuel cell system, the fourth on-off valve 216 and the sixth on-off valve 234 are open, and the fifth on-off valve 232 is closed.

In the fuel cell 250, the electrochemical reactions represented by Formulas 1 and 2 below are caused by the hydrogen-containing gas (fuel gas) supplied from the reformer 108 through the fuel gas supply passage 126 and the oxidizing agent (for example, air) supplied from the oxidizing gas supplying device 236. Overall, electricity and heat can be obtained by the reaction represented by Formula 3 below.

$$\tfrac{1}{2}O_2 + 2H^+ + 2e^- \rightarrow H_2O \qquad (1)$$

$$H_2 \rightarrow 2H^+ + 2e^- \qquad (2)$$

$$\tfrac{1}{2}O_2 + H_2 \rightarrow H_2O \qquad (3)$$

A fuel exhaust gas (fuel off gas) containing residual hydrogen which has not contributed to the reaction represented by Formula 2 in the fuel cell 250 is discharged from the anode of the fuel cell 250, supplied through the fuel off gas supply passage 127 to the combustor 112, and utilized as the combustion gas.

Operation: Stop Process

An outline of operations during the stop process of the fuel cell system 200 will be explained. The controller 240 controls respective portions of the fuel cell system 200 to execute the following operations.

When the stop process of the fuel cell system 200 starts, the operations of the raw material flow rate adjuster 102 and the water flow rate adjuster 104 stop and the first on-off valve 103 and the second on-off valve 105 are closed to stop the hydrogen generating operation of the hydrogen generator 100. After the supply of the water and raw material to the hydrogen generating unit 101 stops, a residual gas is supplied to the combustor 112 for a while by the volume expansion due to the evaporation of water remaining in the evaporator 106. Therefore, the combustor 112 continues the combustion operation. When the combustor 112 stops the combustion, the fourth on-off valve 216 and the sixth on-off valve 234 are closed. With this, a sealing operation is completed, that is, the gas passage including the reformer 108 is sealed and the reformer 108 is sealed to form the closed space. Then, as with Embodiment 1, the pressure compensating operation of the hydrogen generator 101 is executed based on the temperature detected by the temperature detector 110. Since details are the same as those in Embodiment 1, explanations thereof are omitted.

Modification Example 1

A fuel cell system of Modification Example 1 of the present embodiment can be realized by applying each of Modification Examples of Embodiment 1, Embodiment 2, and Modification Examples of Embodiment 2 to the present embodiment.

Modification Example 2

The fuel cell system of Modification Example 2 is configured such that although the seventh on-off valve 118 serves as the depressurizing unit in the fuel cell system of Embodiment 3, the bypass passage 128, the seventh on-off valve 118, and the third on-off valve 116 are not provided, and the sixth on-off valve 234 serves as the depressurizing unit. In the case of providing the cooler in the fuel cell system of Modification Example 2, it is disposed on the fuel off gas supply passage 127. In Modification Example 2, the cooling operation of the cooler may be executed according to need in at least the pressure compensating operation.

Modification Example with Respect to Embodiments 1, 2, and 3 and Modification Examples Thereof In each of Embodiments 1, 2, 3, and Modification Examples thereof, the air supply unit 114 may be activated during the depressurizing operation regarding the steam to supply the air to the combustor 112.

The gas discharged from the seventh on-off valve 118 as the depressurizing unit or the depressurizing unit 218 is mainly the steam. However, this discharged gas may contain the combustible gas or carbon monoxide. In such a case, by the operation of the air supply unit 114, the exhaust gas discharged from the depressurizing unit to flow into the combustor 112 or the water tank 220 is diluted by air to be then discharged to the atmosphere.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The hydrogen generator and fuel cell system of the present invention are useful as the hydrogen generator and fuel cell system, in each of which the reliability of the reformer is improved by making the possibilities of the incomplete reforming reaction of the raw material and the deterioration of the catalyst by high-temperature steam to be lower than before.

REFERENCE SIGNS LIST 100, 100A, 100B, 100C, 100D hydrogen generator
102 raw material supply unit
103 first on-off valve
104 water supply unit
105 second on-off valve
106 evaporator 108 reformer
109 reforming catalyst
110 temperature detector
112 combustor
114 air supply unit
116 third on-off valve
118 seventh on-off valve
119 cooler
120 gas-liquid separator
122 raw material gas supply passage
124 water supply passage
126 fuel gas supply passage
127 fuel off gas supply passage
128 bypass passage
130 flue gas passage
140 controller
150 hydrogen utilizing device
216 fourth on-off valve
220 water tank
229 branch passage
230 branch passage
232 fifth on-off valve
234 sixth on-off valve
236 oxidizing gas supplying device
240 controller
250 fuel cell

The invention claimed is:

1. A method for operating a hydrogen generator including a steam supply unit and a reformer including a reforming catalyst and configured to generate a hydrogen-containing gas by using a raw material and steam, the method comprising steps of:
   (a) executing a sealing operation in which during stop of the hydrogen generator, with hydrogen contained in the reformer, communication between a gas passage containing at least the reforming catalyst and atmosphere is blocked to seal the reformer; and
   (b) executing a pressure compensating operation in which, in order to compensate a pressure decrease in the reformer due to a temperature decrease in the reformer after the sealing operation, with the hydrogen contained in the reformer, the steam is supplied from the steam supply unit to the reformer.

2. The method according to claim 1, further comprising a step of (c), in order to compensate the pressure decrease in the reformer due to the temperature decrease in the reformer after the sealing operation,
   in a case where a temperature of the reforming catalyst is a temperature at which carbon in the raw material deposits on a surface of the reforming catalyst when the raw material flows through the reforming catalyst, executing a first pressure compensating operation of supplying the steam to the reformer in a state where the communication between the gas passage containing at least the reforming catalyst and atmosphere is blocked, and
   in a case where the temperature of the reforming catalyst is a temperature at which the carbon in the raw material does not deposit on the surface of the reforming catalyst when the raw material flows through the reforming catalyst, executing a second pressure compensating operation of supplying the raw material to the reformer in a state where the communication between the gas passage containing at least the reforming catalyst and atmosphere is blocked.

3. The method according to claim 1, wherein the step (b) is executed each time the temperature decrease in the reformer proceeds.

4. The method according to claim 1, wherein:
   the steam supply unit includes an evaporator configured to evaporate water, and
   the method further comprises a step of:
   (c) supplying the water to the evaporator for generation of the steam, an amount of the steam compensating at least the pressure decrease in the reformer due to the temperature decrease in the reformer.

5. A method for operating a hydrogen generator including a steam supply unit and a reformer including a reforming catalyst and configured to generate a hydrogen-containing gas by using a raw material and steam, the method comprising steps of:
   (a) executing a sealing operation in which during stop of the hydrogen generator, with hydrogen contained in the reformer, communication between a gas passage containing at least the reforming catalyst and atmosphere is blocked to seal the reformer;
   (b) executing a pressure compensating operation in which, in order to compensate a pressure decrease in the reformer due to a temperature decrease in the reformer after the sealing operation, with the hydrogen contained in the reformer, the steam is supplied from the steam supply unit to the reformer; and
   (c) releasing to atmosphere a part of pressure of the steam supplied to the reformer, by discharging from the reformer a part of gas containing the steam, in the pressure compensating operation in the step (b).

6. The method according to claim 5, wherein:
   the hydrogen generator further includes a discharge passage through which the part of gas discharged in the step (c) flows, and
   the method further comprises a step of:
   (d) cooling the discharge passage in the pressure compensating operation in the step (b).

7. The method according to claim 5, wherein:
   the hydrogen generator further includes:
      a discharge passage through which the part of gas discharged in the step (c) flows;
      a combustor communicating with the discharge passage and configured to heat the reformer; and
      an air supply unit configured to supply combustion air to the combustor, and
   the method further comprises a step of:
   (e) operating the air supply unit in the pressure compensating operation in the step (b).

8. The method according to claim 1, wherein the step (b) is performed in a state where the hydrogen exists in the reformer, an amount of the hydrogen corresponding to an amount necessary to inhibit steam oxidation of the reforming catalyst.

9. The method according to claim 1, wherein the step (b) is performed in a state where the communication between the gas passage containing at least the reforming catalyst and atmosphere is blocked.

10. The method according to claim 5, further comprising a step of (f), in order to compensate the pressure decrease in the reformer due to the temperature decrease in the reformer after the sealing operation,
   in a case where a temperature of the reforming catalyst is a temperature at which carbon in the raw material deposits on a surface of the reforming catalyst when the raw material flows through the reforming catalyst, executing a first pressure compensating operation of supplying the steam to the reformer in a state where the communication between the gas passage containing at least the reforming catalyst and atmosphere is blocked, and in a case where the temperature of the reforming catalyst is a temperature at which the carbon in the raw material does not deposit on the surface of the reforming catalyst when the raw material flows through the reforming catalyst, executing a second pressure compensating operation of supplying the raw material to the reformer in a state where the communication between the gas passage containing at least the reforming catalyst and atmosphere is blocked.

11. The method according to claim 5, wherein the step (b) is executed each time the temperature decrease in the reformer proceeds.

12. The method according to claim 5, wherein:
the steam supply unit includes an evaporator configured to evaporate water, and
the method further comprises a step of:
(f) supplying the water to the evaporator for generation of the steam, an amount of the steam compensating at least the pressure decrease in the reformer due to the temperature decrease in the reformer.

13. The method according to claim 5, wherein the step (b) is performed in a state where the hydrogen exists in the reformer, an amount of the hydrogen corresponding to an amount necessary to inhibit steam oxidation of the reforming catalyst.

14. The method according to claim 5, wherein the step (b) is performed in a state where the communication between the gas passage containing at least the reforming catalyst and atmosphere is blocked.

\* \* \* \* \*